United States Patent

White

[15] 3,652,249
[45] Mar. 28, 1972

[54] APPARATUS FOR MANUFACUTRING ASSEMBLIES OF CLOSED GLASS TUBES EACH WITH A PELLET THEREIN

[72] Inventor: James C. White, Rutherford, N.J.
[73] Assignee: Propper Manufacturing Co., Inc.
[22] Filed: Aug. 26, 1969
[21] Appl. No.: 853,146

[52] U.S. Cl. ................................65/156, 65/105, 65/109, 65/270, 53/39, 53/266
[51] Int. Cl. .......................................................C03b 23/18
[58] Field of Search.....................65/105, 108, 109, 156, 270; 53/39, 38, 266

[56] References Cited

UNITED STATES PATENTS

| | | | |
|---|---|---|---|
| 3,228,167 | 1/1966 | Schmidt | 53/266 X |
| 3,437,471 | 4/1969 | Bott | 65/270 |
| 3,478,492 | 11/1969 | Cloud et al. | 53/266 |

Primary Examiner—Arthur D. Kellogg
Attorney—Blum, Moscovitz, Friedman & Kaplan

[57] ABSTRACT

A method and apparatus for manufacturing assemblies of closed tubes each with a pellet therein. The tubes initially have only one closed end and an opposed open end. These tubes are positioned in an upright attitude with open ends up, and a pellet is deposited in each tube by a pellet-depositing means at a loading station where each tube is positioned in its upright position by a positioning means. A feeding chain is intermittently driven to feed the tubes in a stepwise manner to and from the loading station where a dispenser sequentially dispenses a pellet into each tube. Beyond the loading station the successive tube, are preheated at the region of their upper open ends, and then they are sealed at these preheated upper open ends. The sealing takes place at a sealing station where each tube is rotated about its axis while its preheated upper end is held stationary to separate the preheated upper end from the remainder of the tube which becomes automatically closed at the sealing station.

4 Claims, 11 Drawing Figures

PATENTED MAR 28 1972

INVENTOR.
JAMES C. WHITE

BY
Blum, Moscovitz, Friedman & Kaplan
ATTORNEYS

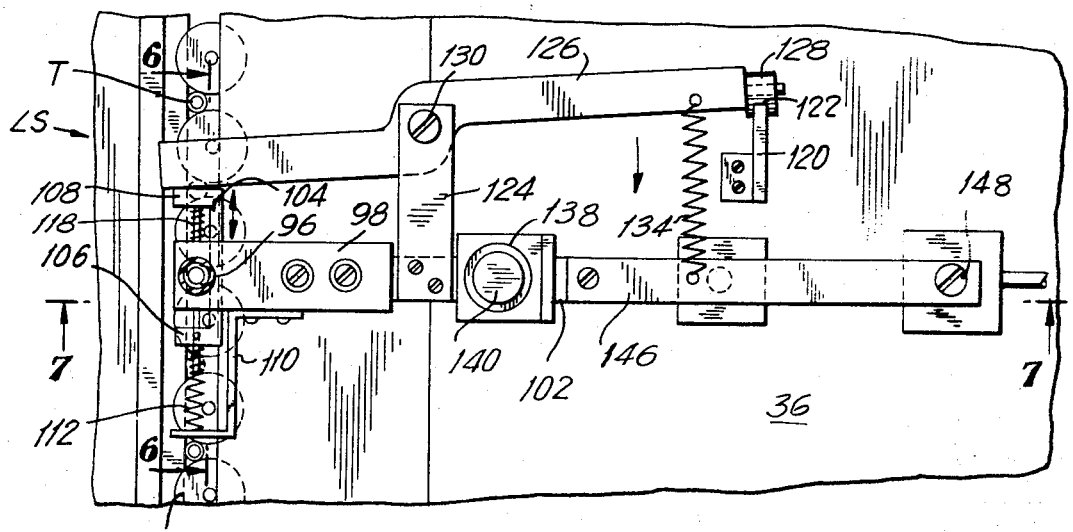
FIG.5
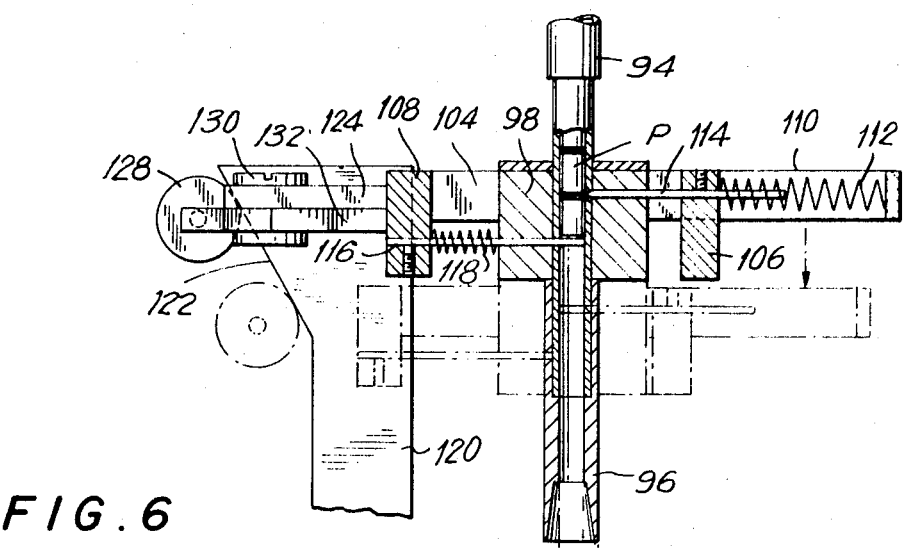
FIG.6
INVENTOR.
JAMES C. WHITE
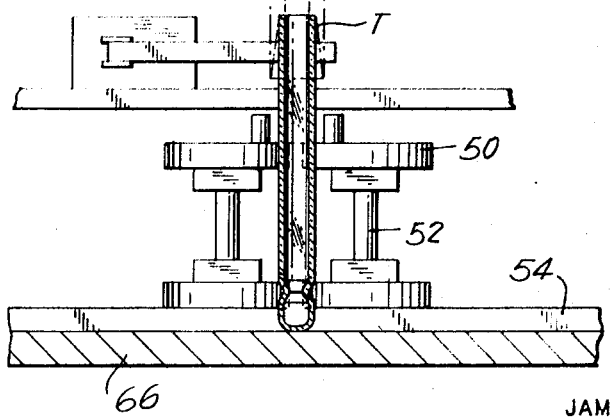

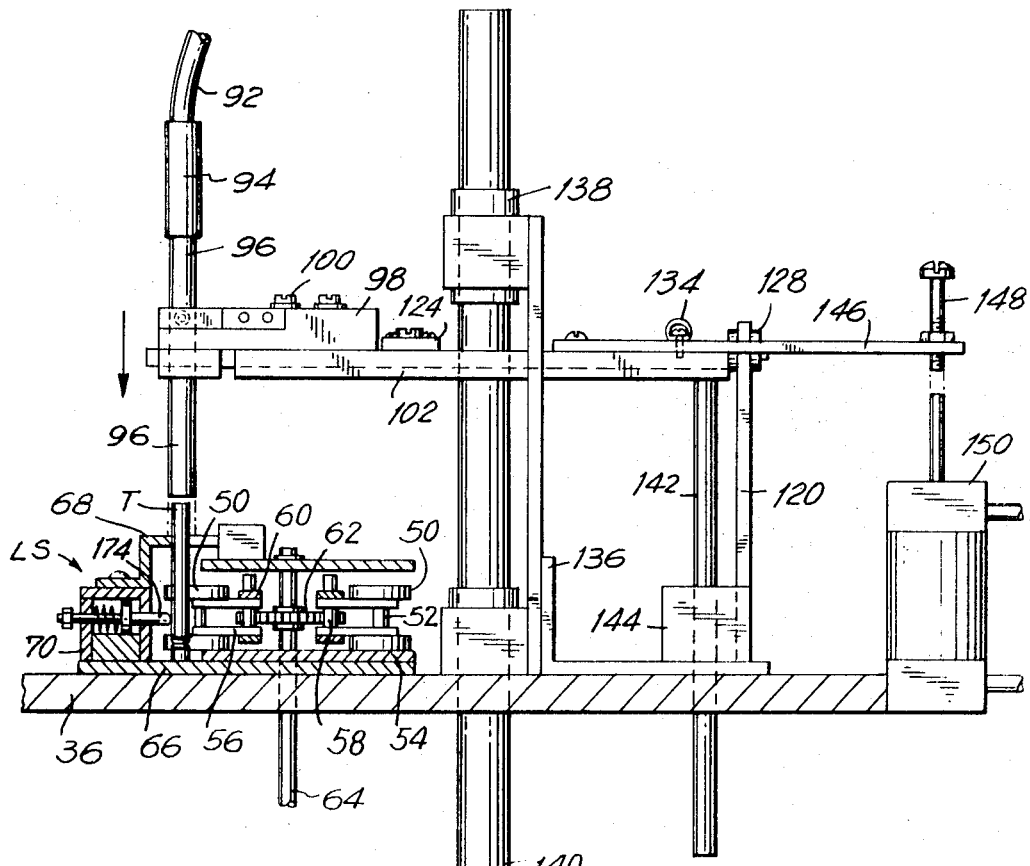
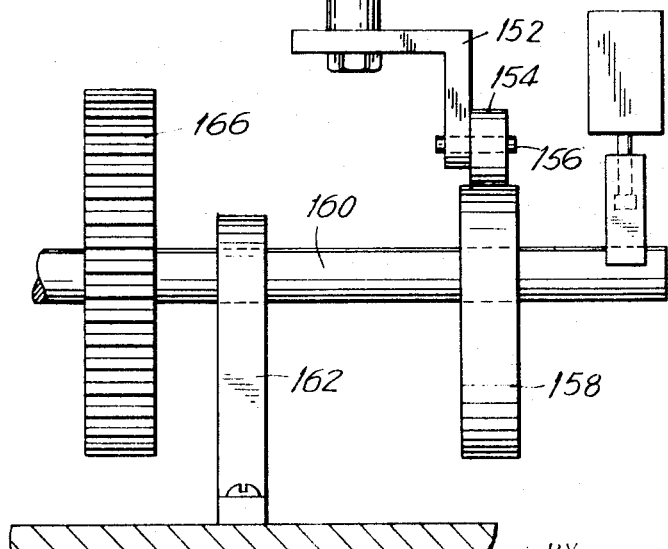
FIG.7

INVENTOR.
JAMES C. WHITE

APPARATUS FOR MANUFACUTRING ASSEMBLIES OF CLOSED GLASS TUBES EACH WITH A PELLET THEREIN

BACKGROUND OF THE INVENTION

The present invention relates to a method and apparatus for manufacturing assemblies of closed tubes each with a pellet therein.

Assemblies of this type may be used, for example, in order to provide an indication of the existence of predetermined conditions to which the pellet responds by changing its appearance. For example, it is possible to provide a pellet which will respond to a given amount of dry heat by changing its color or by melting, for example, within a closed tube so that when the pellet has a given appearance it will be known that a given amount of heat has been provided.

Thus, in dry heat sterilizers, it is necessary to determine when the sterilizing operations should be terminated. A glass tube with a suitable pellet therein can be suspended in such a dry heat sterilizer. The pellet may additionally have a color such as a blue color, and when a given amount of heat has been provided in the sterilizer the pellet will have become a formless, fused black mass, indicating that the sterilization cycle has been completed. This cycle will be determined in accordance with a combination of temperature and time. Thus a given relatively high temperature with a short period of time may be the equivalent of a given relatively low temperature with a longer period of time. The pellet is capable of responding to any desired combination of time and temperature which gives a given amount of heat, in order to assume a condition progressively ranging from the initial blue color to the final formless fused black mass depending upon the extent to which heat has been supplied to the sterilizer. It thus becomes possible with such an assembly to provide an accurate indication of the degree of dry heat sterilization.

Indicators of this latter type, while known, are relatively expensive because of the manual operations which are required in the manufacture thereof. Thus, it becomes necessary for an operator to place a pellet manually within the interior of a glass tube one end of which is closed, the pellet being dropped into the tube through an open end thereof. Then the glass of the tube is heated at the region of its open end so that the tube can then be sealed to form the assembly of a closed tube with a pellet situated therein. Thus, while it is indeed possible to carry out manual operations for achieving indicators of the above general type, the costs involved in the manufacture of such assemblies by these manual operations render the assemblies extremely expensive, so that they are not as widely used as would otherwise be the case. Indicators of this type are suited not only for large hospital installations but also for small dry sterilizers as are commonly used in the offices of dentists and doctors. However, because of the high cost of conventionally manufactured indicators of this type, where extensive manual operations are essential, these indicators have not been widely used.

SUMMARY OF THE INVENTION

It is accordingly a primary object of the invention to provide a method and apparatus for manufacturing assemblies of the above type at a cost which is far smaller than has heretofore been possible.

In particular, it is an object of the present invention to provide a method and apparatus which are capable of eliminating manual operations, if not entirely then at least to a very large extent, so that in this way the manufacturing cost can be substantially reduced.

Yet another object of the invention is to provide a method and apparatus which require only a supply of tubes and a supply of pellets, the operation then going forward automatically to provide the complete assemblies as described above.

Also, it is an object of the invention to provide a construction and method capable of automatically achieving these results in a manner which will produce assemblies of the above type at a high rate so that a large output is achieved in a small time, while at the same time operating very reliably to provide the required assemblies.

With the method and apparatus of the invention the tubes are initially positioned by a suitable positioning means at a loading station with an open end of each tube up, while an opposed closed end thereof is located at the bottom end of each upright tube. At the loading station a pellet-depositing means acts to deposit a pellet in each tube through the upper open end thereof. The tubes are fed in series to and beyond the loading station by a feeding means which acts intermittently so that each tube will have a predetermined dwell period at the loading station in order to receive a pellet. Beyond the loading station there is a sealing station where the initially open end of the tube is sealed so as to form a tube which is closed at both ends and which has the pellet situated therein. Prior to reaching the sealing station a preheating means acts to preheat each tube at the region of its upper open end. At the sealing station a gripping means grips the tube at its heated upper end region while the remainder of the tube is rotated about its axis to twist the tube between the upper stationary part thereof and the part beneath the heat-softened region of the tube, so that the tube becomes twisted at this latter region to form a smoothly closed hemispherical sealed tube end, while the gripped part of the tube separates itself from the remainder thereof so that it can then be discarded. In this way each tube is completed and fed further to any desired collecting station. The several tubes are acted upon by this method and apparatus of the invention in a fully automatic sequential manner achieving the high output at low cost referred to above.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

The invention is illustrated by way of example in the accompanying drawings which form part of this application and in which:

FIG. 5 is a fragmentary top plan view showing part of the pellet-depositing means of the invention;

FIG. 6 is a fragmentary partly sectional elevation of the structure of FIG. 5 taken along line 6—6 of FIG. 5 in the direction of the arrows, showing in particular a control cam of this part of the apparatus;

FIG. 7 is a transverse fragmentary sectional elevation of the structure of FIG. 5 taken along line 7—7 of FIG. 5 in the direction of the arrows and showing further details of the part of the apparatus which deals with the depositing of a pellet in each tube;

DESCRIPTION OF A PREFERRED EMBODIMENT

Figure 1:
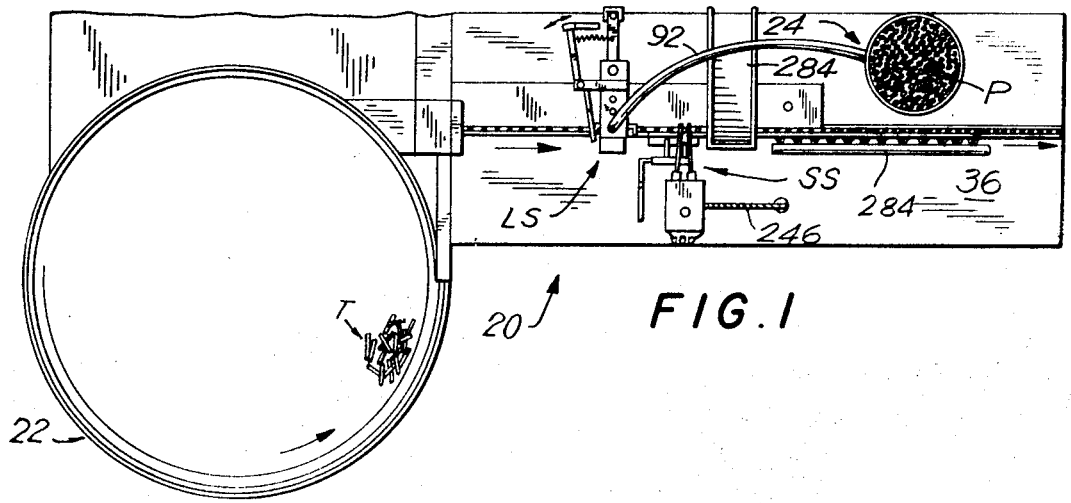
FIG. 1 is a top plan view showing in a simplified, schematic manner one embodiment of an apparatus of the invention for carrying out the method of the invention.
Figure 2:
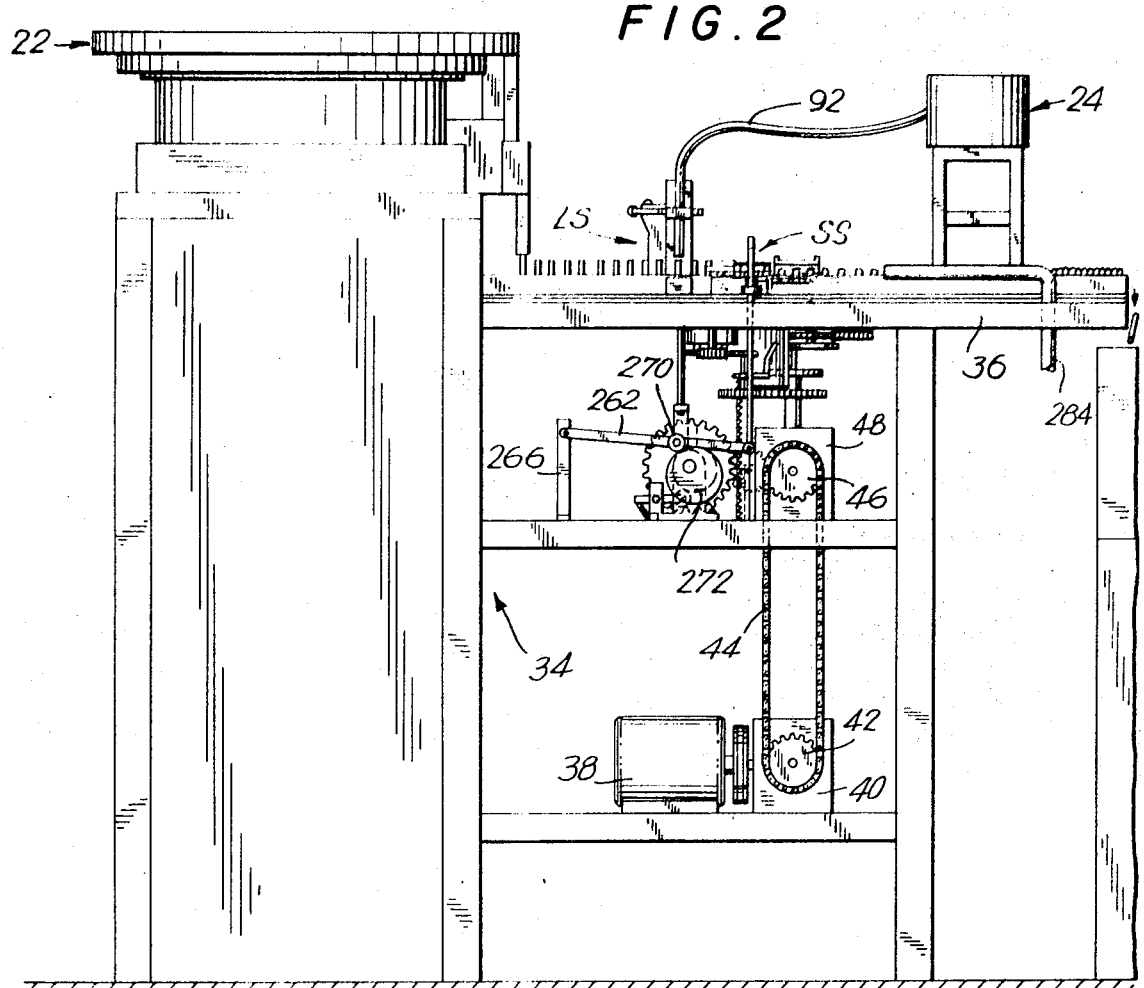
FIG. 2 is a front elevation of the structure of FIG. 1 also showing the apparatus in a simplified schematic manner.
Figure 3:
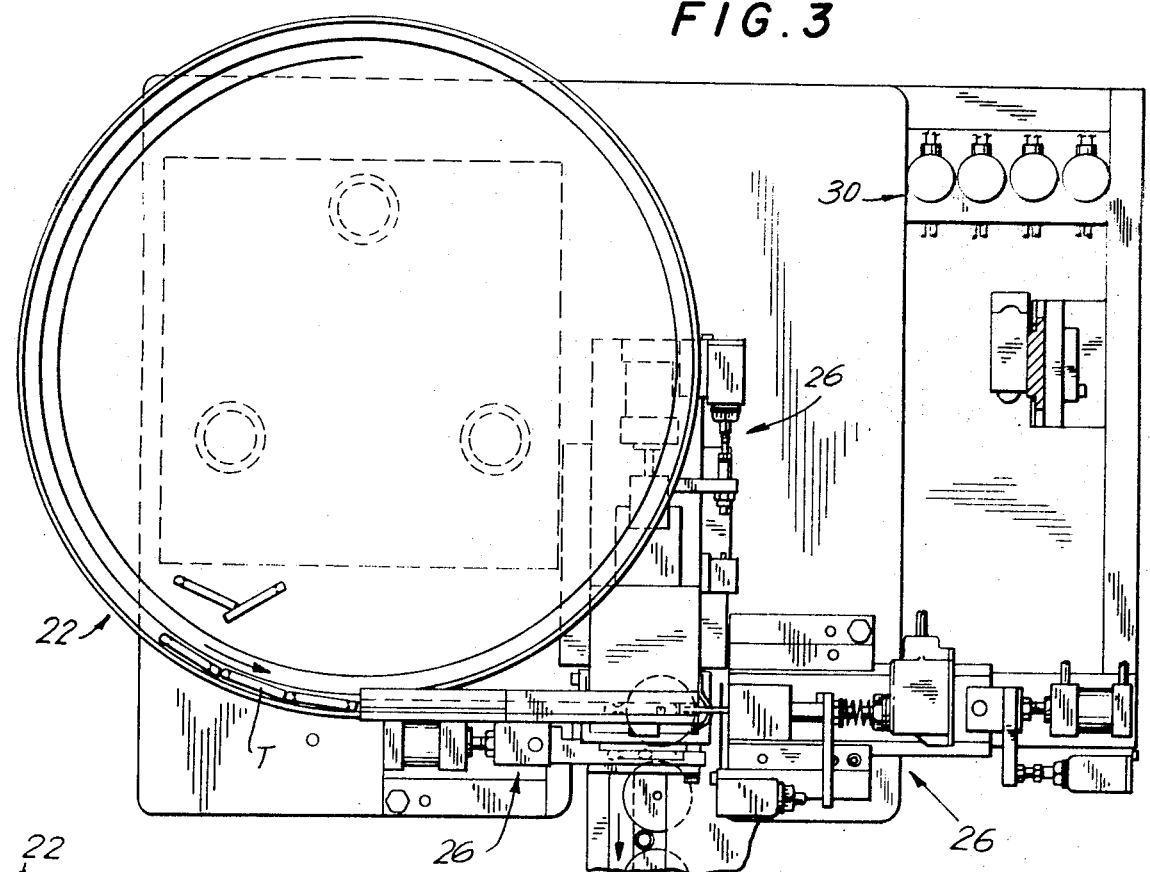
FIG. 3 is a fragmentary top plan view of the structure shown at the left region of FIG. 1 with the view of FIG. 3 showing this structure as it appears from the right of FIG. 1 so that the parts in FIG. 3 are turned by 90° in a clockwise direction with respect to their orientation in FIG. 1.
Figure 4:
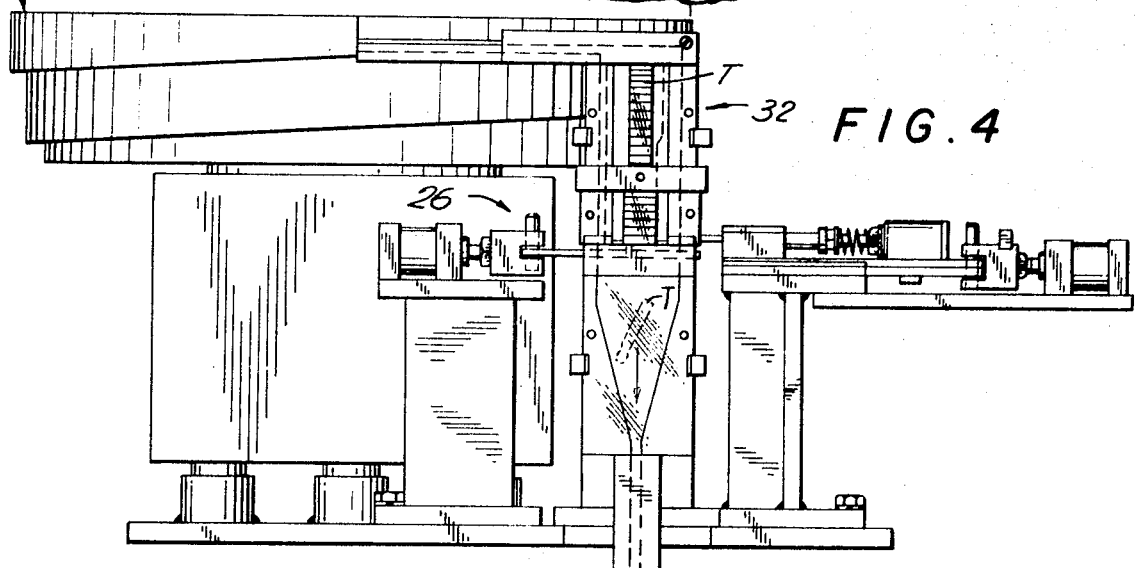
FIG. 4 is a fragmentary, partly sectional elevation of the structure illustrated in FIG. 3.

Referring to FIGS. 1 and 2, the apparatus 20 of the invention which is illustrated therein makes use of known Syntron units 22 and 24 to deliver tubes and pellets, respectively, one at a time to the apparatus in a manner described in greater detail below. These Syntron units do not form a part of the present invention and are well known so that they are not described in detail. The Syntron unit 22 simply receives en masse a plurality of tubes which are closed only at one end, and these tubes T are delivered one after the other, as shown at the left of FIG. 3, out of the hopper to move along a predetermined path to a feeding means of the invention which is described in greater detail below. FIG. 3 shows various control units 26 which also form no part of the present invention and which are not described in detail. These units are actuated by electrical switches and include solenoid-operated air valves which function to regulate delivery of the tubes T. The units 26 include probes which sense the orientation of each tube as it advances toward the feeding means. These probes function to assure that each tube is received in the feeding means in a vertical position with the closed end of the tube down and its open end up. Thus, as may be seen from FIG. 4, one tube T is indicated on its way down a tapered guide while a lower tube T is shown at the lower part of FIG. 4 at a location when it has almost reached its final elevation in which it remains while fed by the feeding means 28 which is fragmentarily illustrated at the lower part of FIG. 4. The probes of the units 26 will sense whether or not a tube T must be tipped in order to become situated reliably in an upright position with its open end up at the feeding means. FIG. 3, as well as FIG. 4 shows further features which are of no particular pertinence with respect to the present invention, such as the solenoid valves 30, the guide 32 where the several tubes T are horizontally oriented and advanced down to the structure which will provide a vertical depositing of each tube with its bottom down at the feeding means 28.

Referring to FIG. 2, the entire apparatus is supported by a suitable framework 34 which includes an upper bench or table 36 where the various units are located, while beneath the bench 36 are the various drives and control cams and the like indicated in part in FIG. 2. Referring to FIG. 2, the entire apparatus is driven from a single motor 38. This motor drives a lower gear box 40 which has an output sprocket 42 driving an endless chain 44 which transmits the drive to an input sprocket 46 of an upper gear box 48. From the gear box 48 the drives are taken through various transmissions and controls to the several units and stations of the invention.

Figure 8:
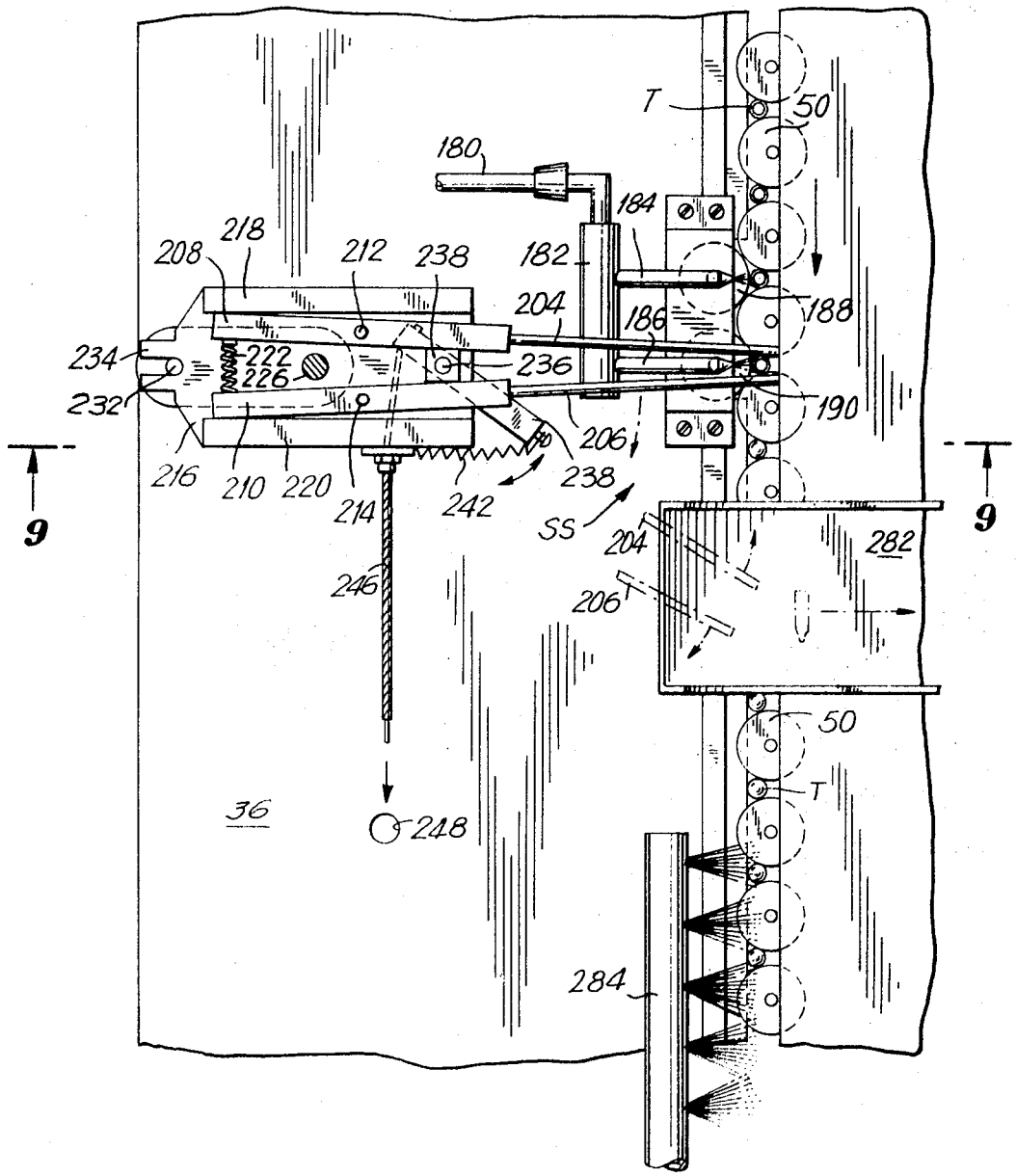
FIG. 8 is a fragmentary, partly schematic top plan view of the sealing station situated beyond the loading station of FIGS. 5-7 in the path of movement of the tubes, FIG. 8 illustrating both the preheating structure and sealing apparatus, as well as a final cooling assembly which acts on the tubes after they have been sealed.

The feed means 28 of the invention is in the form of an endless chain supporting for free rotary movement a series of rollers in such a way that an upright tube can be received between and supported against a pair of successive rollers. Thus, FIG. 8 shows some of the rollers 50 of that run of the endless chain which engages and advances the tubes T. These rollers 50 are supported on pins 52 (FIG. 6), respectively, for free rotary movement, and these pins are in turn interconnected by links which provide for free swinging of the links which carry the pins 52 which support the rollers 50. The chain is slidable along a stationary support plate 54 on which it rests. FIG. 7 shows the front run of the chain at the left and the rear run thereof at the right. Thus, referring to FIG. 7 it will be seen that the pins 52 are each carried by a pair of links 56 which extend transversely with respect to the length of the chain and which terminate at inner ends connected to further pins 58 which are interconnected by the longitudinally extending links 60 by means of which the several pins 58 are connected to form the endless chain where the links 56 project laterally from the endless chain to carry the pins 52 and the rollers 50. These pins 58 are driven by a sprocket 62 fixed on a rotary driven shaft 64 which extends up through the table 36. The driving sprocket 62 is situated between the ends of the chain which are respectively guided around suitable, freely rotatable guiding sprockets which are not illustrated. The links 56 are capable of swiveling as the chain turns around the end sprockets so as to situate the left links 56 in the manner shown in FIG. 7 where the rollers 50 at the left of FIG. 7 are capable of coacting with a tube T.

Each tube T is dropped downwardly from the Syntron unit 22 so as to rest with its bottom end on a plate 66 which extends along the chain-supporting plate 54 but projects to the left, as viewed in FIG. 7, forwardly beyond the edge of plate 54 so as to slidably support each tube T at its bottom end. As was pointed out above in connection with FIG. 8, the several tubes are arranged in series in the gaps between the successive rollers 50 of the front run of the endless chain which forms the feeding means 28, so that the tubes will be fed along the top surface of the plate 66. This plate fixedly carries an L-shaped guide 68 supported upon a channel assembly 70, as shown in FIG. 7. This channel assembly 70 is also affixed to the plate 66 and serves to fixedly carry the guide 68 which has a free upper edge engaging the tubes T to maintain them in the upright position.

Figure 10:
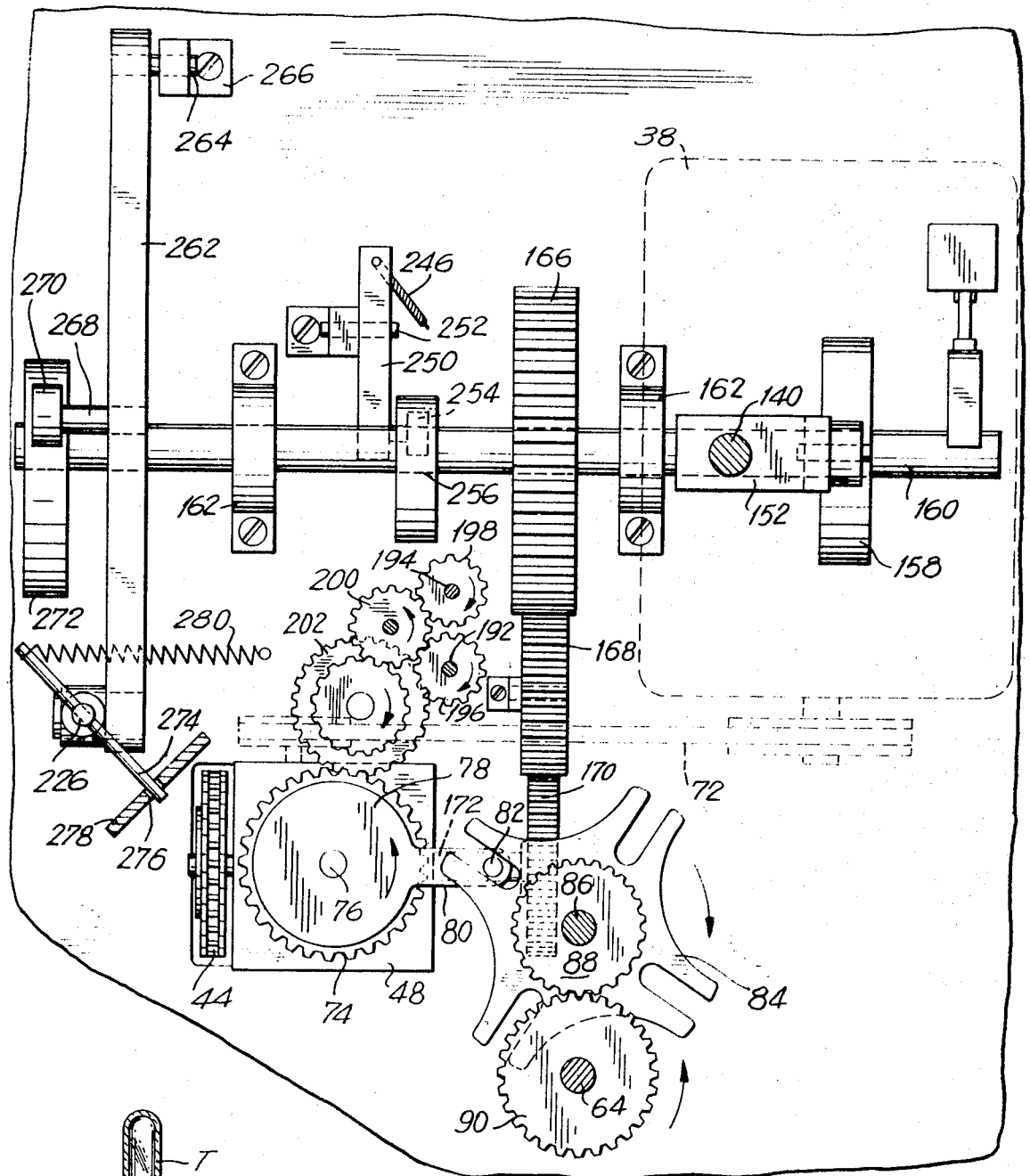
FIG. 10 is a fragmentary partly sectional plan view taken along line 10—10 of FIG. 9 in the direction of the arrows and showing details of the drives to the various components.

Referring to FIG. 10, it will be seen that the motor 38 drives the lower gear box by way of a belt-and-pulley drive 72. FIG. 10 shows the upper gear box 48 and the top part of the chain 44 which transmits the drive thereto. This upper gear box 48 has an output gear 74 driven by a shaft 76 which is fixed to a plate 78 carrying a radial arm 80 which in turn fixedly carries at its outer end a Geneva driving pin 82. This pin coacts with a rotary Geneva drive wheel 84 which is turned by an increment of 90° at each revolution of the plate 78 which, of course, turns together with the shaft 76 and the gear 74. Thus, the Geneva wheel 84 will be turned through an increment of 90° after which it will remain stationary for a given time before again being turned through the next increment of 90° at the next revolution of the radial arm 80.

The Geneva wheel 84 is fixed to a rotary shaft 86 which is supported for rotary movement by any suitable bearings carried by the table 36. This shaft 86 is fixed to a gear 88 which in turn meshes with a gear 90. The gear 90 is fixed to the shaft 64 which drives the driving sprocket 62 of the chain which forms the feed means 28. As a result, the rollers 50 of the feed means will be advanced in a stepwise manner through a given increment at each turning of the Geneva star wheel 84. Between these increments of movement the chain will have a dwell period of a given duration. As a result of this stepwise movement of the feed means 28, the successive tubes T will move in sequence to the loading station LS where the tubes T respectively receive the pellets P. Thus a pellet P can be introduced into a tube T at the loading station LS during the dwell of a tube at the loading station.

The several pellets P are supplied en masse to the hopper of the Syntron unit 24 indicated in FIGS. 1 and 2. This Syntron unit 24 will, in a known way, situate the pellets P one after the other along the interior of the flexible tube 92. The end of this flexible tube distant from the Syntron unit 24 is connected with a substantially rigid extension 94 which in turn is connected with a substantially rigid tube 96 which flares downwardly at the region of its lower end, as indicated in FIG. 6, so that the lower end of the tube 96 is capable of moving over the open upper end of a tube T which is at the loading station. FIG. 6 shows a series of pellets P situated one above the other in the vertical tube 96, these pellets of course flowing through the tubular connection 94 from the flexible tube 92 into the tube 96.

This tube 96 is fixedly carried by an arm 98 fixed by screws 100 to a lower horizontal arm 102 (FIG. 7). The arm 98 is formed adjacent its front end with a transversely extending opening through which an elongated rod 104 passes. This rod 104 is connected at its free ends to a pair of forwardly extending end walls 106 and 108. The arm 98 fixedly carries a bracket 110 which presses against one end of a spring 112. The other end of the spring 112 presses against the end wall 106 and this end wall 106 fixedly carries a pin 114 in the manner shown most clearly in FIG. 6. Thus, the spring 112 seeks to shift the wall 106 to the left, as viewed in FIG. 6.

The other end wall 108 fixedly carries a pin 116, and a spring 118 is coiled about the pin 116 between the wall 108 and the side of the arm 98 distant from the bracket 110. This spring 118 seeks to displace the wall 108 to the left, so that the rod or bar 104 is constantly urged toward the left, as viewed in FIG. 6. As is apparent from FIG. 6, the vertical distance between the pins 114 and 116 is equal to the length of a pellet P. The spring 112 seeks to introduce the pin 114 between the first and second pellets, and when the pin 114 is situated between these pellets, the pin 116 is displaced away from its position beneath the lowermost, first pellet so that the latter will drop into the tube T. The rigid tube 96 is formed with suitable openings which receive the pins 114 and 116.

The table 36 fixedly carries behind the feed means at the loading station LS a vertically extending cam 120 which has an inclined camming surface 122, as shown most clearly in FIG. 6. The arm 102 also fixedly carries a laterally extending bar 124 which pivotally supports a lever 126. This lever has at its rear end a pin which supports for free rotary movement a cam follower roller 128 which coacts with the camming edge 122 of the cam 120. Forwardly of the pivot 130 which serves to connect the lever 126 to the bar 124 the lever 126 terminates in a free end 132 which directly engages the end wall 108. A spring 134 is connected at one end to the lever 126 at the region of the follower 128 and at its opposite end to the arm 102.

Referring to FIG. 7 it will be seen that a bracket assembly 136 fixed on the table 36 carries bearings 138 which serve to guide an elongated bar 140 for vertical movement, and this bar 140 is fixed with the horizontal arm 102. Also the bar 102 at the region of its rear end carries a downwardly extending rod 142 guided through a stationary sleeve 144 and passing through the table 36 so that in this way the bar 102 together with the bar 140 will move vertically without being capable of turning. The arm 102 carries a rearwardly directed extension 146 which carries an adjustable screw 148 which actuates a solenoid valve 150 for purposes which do not form part of the present invention.

The lower end of the rod 140 is fixed to the top of an L-shaped bracket 152 which carries at its lower end a follower roller 154 supported for free rotary movement on the pin 156. This cam follower roller 154 rests on the periphery of a cam 158 fixed to the rotary shaft 160. As may be seen from FIG. 10, the shaft 160 is supported for rotary movement by pillow blocks 162 mounted on a shelf 164 beneath the table top 36. The shaft 160 is driven by way of a gear 166 which meshes with an intermediate gear 168 which in turn is driven by a gear 170. This gear 170 is fixed directly to an output shaft 172 which is driven through the transmission within the upper gear box 48. Thus, as a result of this drive the shaft 160 turns so as to rotate the cam 158 and cause the bracket 152 together with the rod 140 to move up and down, thus carrying the bar 102 up and down together with the arm 98.

As the bar 102 moves up and down the lever 126 moves up and down with respect to the stationary cam 120. The parts will normally have the upper position where the lower end of the tube 96 is spaced above a tube T. As the shaft 160 rotates the assembly moves down enabling the bottom end of the tube 96 to surround and communicate with the interior of the tube T at the upper open top end thereof. In the upper position the follower roller 128 is adjacent the top end of the inclined camming edge 122 so that the front end 132 of the lever 126 locates the walls 106 and 108 in opposition to the force of the springs 112 and 118 at the right positions shown in solid lines in FIG. 6. However, as the assembly moves downwardly in response to rotation of the cam 158, the follower roller 128 rolls along the edge 122 releasing the lever 126 for movement in a clockwise direction about pivot 130 by the spring 134 as viewed in FIG. 5. As a result the front end 132 is displaced to the left, as viewed in FIG. 6 enabling the springs 112 and 118 to expand, so that while the pin 114 will block the next-to-last pellet P, this last bottom pellet P will be released by the pin 118 for forward movement into the tube T, which is at the loading station. The configuration of the cam 158 is such that after the lowermost pellet has been deposited in the tube T, the parts will again be raised to the solid line position of FIG. 6 with pin 116 moving beneath the lowermost pellet to retain the latter while pin 114 again assumes the solid line position shown in FIG. 6. The parts assume their dot-dash line position shown in FIG. 6 at their lower elevation.

The angular position of the cam 158 is interrelated with the Geneva wheel 84 so that when the latter is stationary the pellet-depositing means shown at the upper part of FIG. 6 moves down to deposit a pellet within the tube T at the loading station and the parts then move up back to their initial position before the next increment of movement is imparted to the Geneva wheel 84. This next increment of movement will of course bring the next tube T to the loading station so that these operations will be repeated with the next tube T and in this way the pellet-depositing means coact with the successive tubes as they reach the loading station to deposit a pellet therein.

As may be seen from FIG. 7, the hollow channel 70 which is fixed to the top surface of the plate 66 carries at the loading station LS a spring-pressed pin 174 which presses against each tube T as it reaches the loading station so as to maintain the tube T stationary during depositing of a pellet therein.

As was indicated above, when the pellet-depositing means has moved upwardly back to its initial position shown in solid lines in FIG. 6, the Geneva wheel 84 will receive its next increment of turning so that the feed means 28 will advance the series of tubes through an increment which will locate the next tube at the loading station LS. At the same time the tube T which has just had its interior provided with a pellet P is displaced away from the loading station LS. In this way the tubes progress in sequence and in a stepwise manner to a sealing station SS shown most clearly in FIGS. 8 and 9. However, before reaching the sealing station SS each tube T is preheated at the region of its upper end which is still open.

As is shown most clearly in FIG. 8, a pipe 180 communicates with any source of a combustible gas and communicates through a header 182 with a pair of nozzles 184 and 186. The nozzle 186 forms part of the sealing means at the sealing station SS, while the nozzle 184 is the preheater. The gas which issues from the nozzle 184 supports a combustible flame which engages each tube T so as to preheat the latter at the region of its upper open end. The elevation of the nozzle 186 is apparent from FIG. 9, and the nozzle 184 is situated at this same elevation in advance of the nozzle 186 by the distance indicated in FIG. 8. After a tube T has been preheated by the flame at the nozzle 184, at the next increment of movement the preheated tube is situated at the sealing station SS so that the flame issuing from the nozzle 186 will serve to continue the heating of the tube at the region of its upper end, rendering the glass soft so that the tube can be sealed in a manner described in greater detail below.

A pair of rollers 188 and 190 are respectively situated beneath the nozzles 184 and 186 for engaging the tubes T which are respectively in alignment with these nozzles. The roller 190 is fixedly carried by a rotary shaft 192, and the roller 188 is fixedly carried by a rotary shaft 194 which is shown in FIG. 10. These shafts 192 and 194 are respectively fixed to gears 196 and 198 (see FIG. 10) driven from a common gear 200 which in turn is driven from the gear train 202 which derives its motion from the output gear 74 of the upper gear box 48, as is apparent from FIG. 10. Thus, both of the shafts 192 and 194 will rotate simultaneously, causing rotation of the rollers 188 and 190. These rollers frictionally engage the tubes which are freely turnable, so that as a result the tubes T which are frictionally engaged by the rollers 188 and 190 are rotated about their longitudinal upright axes, respectively. As a result each tube rotates with respect to the flame which engages the same, and in this way the heat is uniformly distributed all around the tubes.

While the entire tube is free to rotate when in engagement with the flame issuing from the nozzle 184, at the sealing station SS the preheated upper end of the tube is held stationary while the glass of the tube is maintained in its softened condition by the flame issuing from the nozzle 186, so that the rotation of the tube by the roller 190 will cause the softened part of the tube to become twisted between the upper stationary and lower rotary portions of the tube, resulting in a sealed closure of the tube at the elevation of the nozzle 186 while the part of the tube above the sealed closure thereof will separate itself from the remainder of the tube. This operation is clearly indicated in FIG. 9. When the upper part of the tube which is held stationary becomes separated from the remainder of the tube, the top closed end of the tube assumes an extremely smooth hemispherical configuration, as indicated at the upper part of FIG. 11.

The upper end of the tube is held stationary at the sealing station SS by a pair of gripping fingers 204 and 206 which are fixed to and project from a pair of bars 208 and 210 respectively, which are swingable about pivots 212 and 214 carried by a plate 216 which has at its opposed side edges upwardly directed flanges 218 and 220 against which the levers 208 and 210 are pressed at their forward ends by a compressed spring 222 situated between and pressing against the levers at the region of their forward ends which are distant from the tube whose upper end is engaged by the fingers 204 and 206 to be gripped by the latter. The plate 216 carries a cover 224 situated over the levers 208 and 210 and covering the latter. This cover 224, however, is only indicated in FIG. 9 and is not shown in FIG. 8 so that the levers 208 and 210 can be more clearly illustrated. A vertically extending rod 226 extends through the plate 216 and the cover 224, and the plate 216 with its cover are freely turnable with respect to the rod 226. As may be seen from FIG. 9, the rod 226 is vertically movable through an opening formed in the table 36 and extends downwardly beyond the latter.

Above the table 36 the rod 226 fixedly carries a lever 228 which in turn supports a bushing 230 on which the plate 216 rests. The lever 228 which is fixed to the rod 226 fixedly carries at its forward end portion an upwardly extending pin 232. This pin 232 extends through a front notch 234 which is formed at the front end of the plate 216. Therefore, when the rod 226 turns about its axis the plate 216 and the structure carried thereby will turn with the rod 226 about the axis of the latter, while at the same time the rod 226 and all of the structure carried thereby can be displaced vertically between the solid and dot-dash line positions indicated in FIG. 9.

Figure 9:
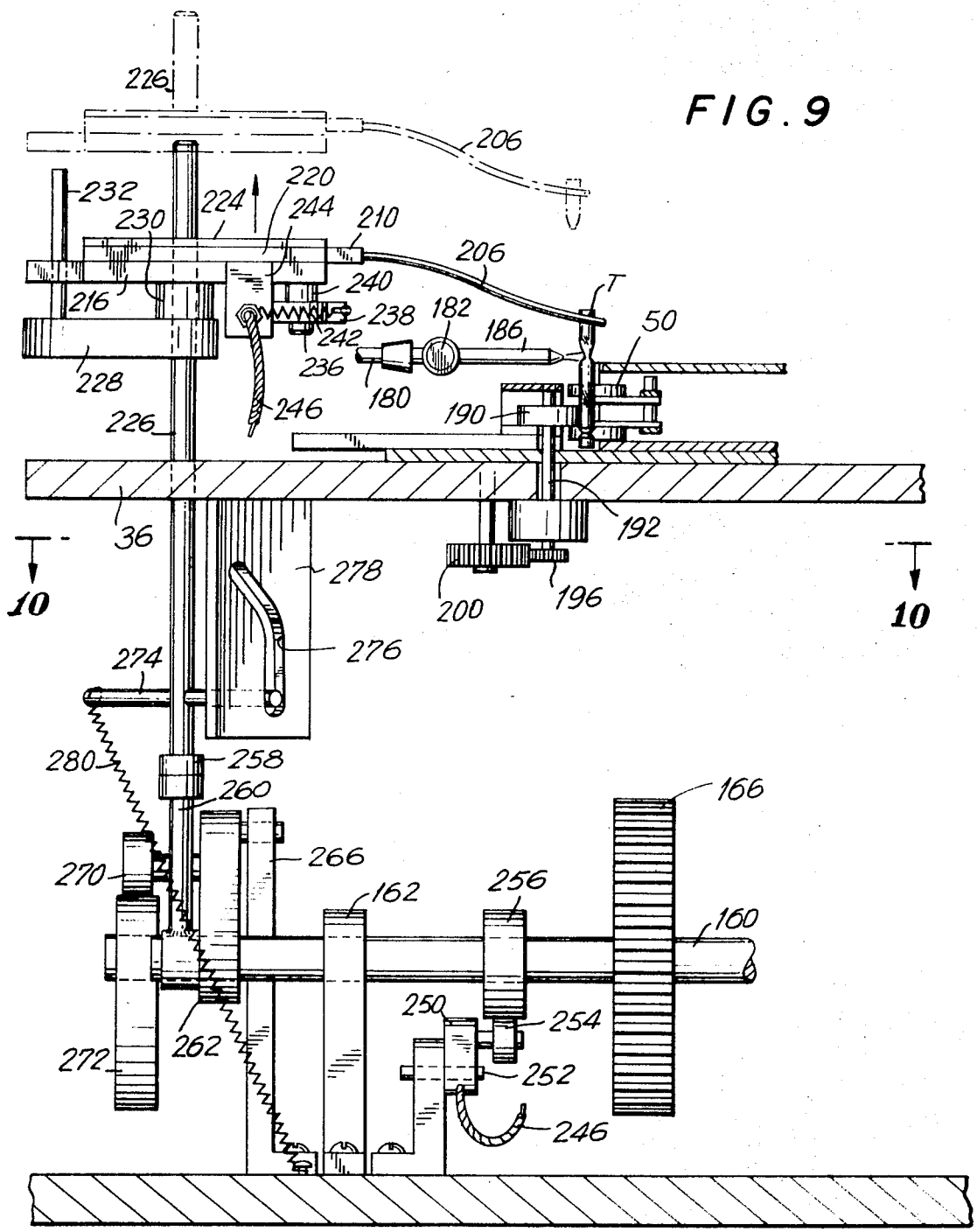
FIG. 9 is a transverse fragmentary sectional elevation taken along line 9—9 of FIG. 8 in the direction of the arrows and showing further details of the apparatus at the sealing station.

Adjacent its rear end the plate 216 is formed with an opening through which a relatively short rod 236 passes so that this rod is freely turnable about its axis with respect to the plate 216. Above the plate 216 the rod 236 has fixed thereto a square cam 238 situated between the levers 208 and 210, as shown most clearly in FIG. 8. Below the plate 216 the rod 236 fixedly carries a lever 238 spaced below the plate 216 by a suitable spacer sleeve 240, as indicated in FIG. 9. A spring 242 is connected at one end to the outer end of the lever 238 and at its opposite end to a small plate 244 which is fixed to and extends downwardly from the plate 216 in the manner shown in FIG. 9. This plate 244 is formed with an opening through which a cable 246 is guided. The free end of this cable is connected to the end of the lever 238 distant from the outer end which is connected to the spring 242. As a result, as indicated in FIG. 8, when the cable 246 is pulled in the direction of the arrow as shown in FIG. 8 adjacent the table opening 248, the lever 238 will be swung in opposition to spring 242. The result is that the cam 238 will engage the levers 208 and 210 in order to spread the fingers 204 and 206 apart from each other in opposition to the force of the spring 222.

Referring now to FIGS. 9 and 10, it will be seen that the cable 246 after passing through the table opening 248 shown in FIG. 8 extends to a lever 250 supported for swinging movement on a stationary pin 252 and carrying distant from the cable 246 a cam follower roller 254 which remains at all times in engagement with cam 256 which is fixed to the shaft 160 for rotary movement therewith. Thus, at predetermined instances during each operating cycle the cable 246 will be pulled by the turning of the lever 250 in response to the coaction of the cam 256 and the follower 254, so as to result in spreading of the fingers 204 and 206 apart from each other, with the immediate return of these fingers toward each other when the pulling force on the cable 246 is released.

As indicated above, the rod 226 is raised and lowered between the solid and dot-dash line positions indicated in FIG. 9. For this purpose the rod 226 is connected by a suitable coupling 258 to a rod 260 the lower end of which is pivotally connected to the free end of a swingable lever 262. The end of the lever 262 distant from the rod 260 is pivotally supported by a pivot pin 264 carried by a bracket 266. Intermediate its ends the lever 262 carries a pin 268 on which a follower roller 270 is supported for free rotary movement. This roller engages a rotary cam 272 which is fixed to the rotary shaft 160. The arrangement of these elements is also apparent from FIG. 2. Thus, as the cam 272 rotates together with the shaft 160, the rod 226 will be raised and lowered by the free end of the lever 262 which is distant from the bracket 266.

Just above the coupling 258 the rod 226 fixedly carries a cross pin 274 a free end of which is received in a camming slot 276 formed in a cam plate 278 which is fixed to and extends downwardly from the table 36 in the manner shown most clearly in FIG. 9. A spring 280 is fixed to the end of the pin 274 distant from the plate 278, and this spring 280 is connected at its bottom end to a stationary member so that this spring 280 acts through rod 226 and its extension 260 on the lever 262 so as to urge the latter downwardly, thus maintaining the follower 270 in engagement with the cam 272.

The lower portion of the camming slot 276 extends vertically while the upper portion thereof is inclined in the manner illustrated in FIG. 9. The result is that when the rod 226 is raised to the dot-dash line elevation indicated in FIG. 9, the pin 274 will be cammed by the upper inclined portion of the slot 276 so as to swing the rod 226 about its axis. This will result in turning of the lever 228 which through the pin 232 will also swing the plate 216 and the structure carried by the latter. The parts will now swing to a position where the fingers 206 and 204 will be located as fragmentarily illustrated in dot-dash lines in FIG. 8. At this time the free ends of these fingers are situated over a downwardly directed chute 282.

With this structure, each tube upon reaching the sealing station SS, after being preheated, will be rotated about its axis by the roller 190 while the flame from the nozzle 186 continues to engage the tube T. At this time the structure lowers the rod 226 to the solid line elevation thereof shown in FIG. 9, and as this rod reaches its lower elevation the cable 246 is pulled by the action of the cam 256 so that the gripping fingers 204 and 206 are spread apart from each other. Upon reaching its lower elevation shown in solid lines in FIG. 9, the cam 256 releases the cable 246 so that the parts return to the position shown in FIG. 8 where the fingers 204 and 206 grip the tube T at the sealing station SS. Thus, this construction forms a gripping means for gripping and maintaining the upper part of the tube stationary while the lower portion thereof beneath the flame is rotated. As a result the part of the tube which is soft and which is situated between the upper stationary and lower rotary parts of the tube becomes twisted and constricted to increasing extent until the upper part of the tube held by the gripping fingers separates itself from the remainder of the tube which becomes formed with a perfectly smooth hemispherical sealed upper end, as pointed out above.

At this time the continued rotary movement of the shaft 160 will act through the cam 272 and the follower 270 to raise the lever 262 so that the rod 226 will be raised, thus raising the separated upper end of the tube from the remainder of the latter. As the pin 274 reaches the upper inclined portion of the groove 276, the entire shaft 226 and the parts carried thereby will swing about the axis of the shaft 226. The coupling 258 is such that the rods 226 and 260 are connected together for axial movement together while the rod 226 is capable of turning with respect to the rod 260. Thus, the fingers 204 and 206 will reach the dot-dash line position fragmentarily indicated in FIG. 8, and the cam 256 will now again exert a pull on the cable 246 so that the fingers will spread apart from each other to drop the free upper end of the tube unto the chute 282 down which the separated upper end of the tube rolls to be received in any suitable receptacle. The rod 226 is again lowered and now the camming slot 276 will act through the pin 274 to return the rod 226 and the parts carried thereby to the angular position indicated in FIG. 8. The up and down movement and swinging of the rod 226 and the structure carried thereby takes place during a feeding increment when the Geneva wheel 84 actuates the feeding means 28. The engagement of the fingers 204 and 206 with the upper end of the tube at the sealing station SS takes place during the dwell of the tubes between the feeding increments.

After a tube is thus treated at the sealing station SS, the continued feeding increments will displace the tube beyond the sealing station, and the tubes now are simply guided in a line one after the other to the right end of the table 36 as viewed in FIGS. 1 and 2. From the right end of the table the tubes simple fall into any suitable collecting receptacle.

As is shown most clearly in FIG. 8, the several tubes T when moved beyond the sealing station SS move beneath and beyond the chute 282. Beyond this chute 282 is located a pipe 284 which communicates with a suitable source of compressed air. At its portion which is directed toward the tubes T situated beyond the chute 282 the pipe 284 is formed with perforations through which the air issues to engage the tubes T so as to cool the latter. Thus this pipe 284 forms a cooling means for cooling the tubes before they are deposited in the collecting receptacle.

Figure 11:
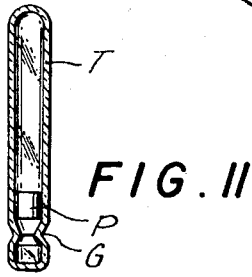
FIG. 11 is a longitudinal sectional elevation of a completed assembly of pellet and tube of the invention.

Thus, with the above structure it is possible to achieve a tube T as shown in FIG. 11 which is sealed shut and which contains a pellet P therein. Adjacent their bottom ends the tubes T are initially formed with outer grooves G. A string may be attached to the tube T at the groove G so that the tube can be suspended in the sterilizer to have the amount of heat register by the change in appearance of the pellet P, as indicated above.

What is claimed is:

1. In an apparatus for manufacturing closed tubes each with a pellet therein, a loading station having a positioning means for positioning a tube in an upright position with a closed end down and an open end up, pellet-depositing means for depositing a pellet into a tube positioned in said upright position by said positioning means at said loading station, and feeding means for sequentially feeding a series of said tubes to said loading station to be respectively positioned in said upright positions by said positioning means at said loading station, said pellet-depositing means successively depositing pellets respectively in said tubes when they successively arrive at said loading station, and said feeding means feeding said tubes sequentially away from said loading station after pellets have been respectively deposited in said tubes by said pellet-depositing means, a sealing station located along the path of movement in which the tubes are fed by said feeding means, and sealing means at said sealing station for converting the open end of each tube into a closed end to seal a pellet in the tube, said feeding means acting in a stepwise manner to intermittently move the tubes along a path extending to said loading station and from the latter to said sealing station, and preheating means situated along said path between said loading and sealing stations for preheating each tube in the region of its upper open end prior to sealing of each tube by said sealing means at said sealing station, rotating means coacting with a tube during preheating thereof to rotate each tube about its axis while it is preheated, a second rotating means coacting with each tube at said sealing station for rotating each tube as it is sealed, and a gripping means gripping each tube at the preheated region thereof, adjacent the upper open end, while each tube is rotated about its axis by said second rotating means so that the tube will become sealed just beneath the upper open end thereof where it is preheated while the part of the tube held by said gripping means will become separated from the remainder of the tube to leave the latter with a sealed top end, said feeding means including a chain having a plurality of freely rotatable rollers between which the tubes are located, and each said rotating means including a friction roller which is driven in rotation and which frictionally engages each tube to rotate the latter about its axis while the rollers of the chain also rotate due to frictional engagement with the tubes.

2. The combination of claim 1 and wherein a cooling means is located along the path of movement of the tubes as they are moved by said feeding means beyond said sealing station for cooling the tubes after the sealing thereof.

3. The combination of claim 2 and wherein said cooling means includes a pipe through which cooling air is directed at the tubes.

4. The combination of claim 2 and wherein said preheating and sealing means include a pair of gas nozzles providing a flame at the preheating location and at the sealing station, respectively.

* * * * *